US006409265B1

(12) United States Patent
Koerlin et al.

(10) Patent No.: US 6,409,265 B1
(45) Date of Patent: Jun. 25, 2002

(54) TILTING AND RECLINING WHEELCHAIR

(75) Inventors: James M. Koerlin, Broomfield; Karen A. Hada, Boulder, both of CO (US)

(73) Assignee: Sunrise Medical HHG, Inc., Longmont, CO (US)

( * ) Notice: Subject to any disclaimer, the term of this patent is extended or adjusted under 35 U.S.C. 154(b) by 8 days.

(21) Appl. No.: 09/583,852

(22) Filed: May 31, 2000

(51) Int. Cl.[7] .............................. A47C 1/02; B60N 2/02

(52) U.S. Cl. .................................. 297/325; 297/362.13

(58) Field of Search ................................ 297/325, 327, 297/328, 329, 316, 317, 362.13

(56) References Cited

U.S. PATENT DOCUMENTS

| | | | | | |
|---|---|---|---|---|---|
| 3,059,970 | A | | 10/1962 | Angell et al. | |
| 3,147,038 | A | | 9/1964 | Barabas | |
| 3,191,990 | A | * | 6/1965 | Rugg et al. | 297/330 X |
| 3,222,105 | A | | 12/1965 | Cross | |
| 3,882,949 | A | | 5/1975 | Anderson | |
| 4,054,319 | A | | 10/1977 | Fogg, Jr. et al. | |
| 4,333,681 | A | | 6/1982 | Nelson | |
| 4,616,874 | A | | 10/1986 | Pietsch et al. | |
| 4,732,423 | A | | 3/1988 | Condon | |
| 4,949,408 | A | | 8/1990 | Trkla | |
| 5,044,647 | A | * | 9/1991 | Patterson | 297/329 X |
| 5,127,113 | A | | 7/1992 | Di Matteo et al. | |
| 5,181,762 | A | * | 1/1993 | Beumer | 297/330 X |
| 5,292,144 | A | * | 3/1994 | Sosnoff | 297/325 X |
| 5,294,141 | A | * | 3/1994 | Mentessi et al. | 297/328 X |
| 5,297,021 | A | | 3/1994 | Koerlin et al. | |
| 5,320,412 | A | | 6/1994 | Eakins et al. | |
| 5,356,172 | A | | 10/1994 | Levy et al. | |
| 5,642,302 | A | | 6/1997 | Dumont et al. | |
| 5,718,442 | A | | 2/1998 | Alexander et al. | |
| 5,957,474 | A | | 9/1999 | Mundy et al. | |
| 5,971,482 | A | * | 10/1999 | Goertzen et al. | 297/329 |
| 6,003,624 | A | | 12/1999 | Jorgensen et al. | |
| 6,015,189 | A | | 1/2000 | Broadhead et al. | |
| 6,068,280 | A | * | 5/2000 | Torres | 297/325 X |
| 6,135,228 | A | | 11/2000 | Asada et al. | |
| 6,206,393 | B1 | | 3/2001 | Mascari et al. | |
| 6,276,704 | B1 | * | 8/2001 | Suiter | 297/327 X |

FOREIGN PATENT DOCUMENTS

| | | | | |
|---|---|---|---|---|
| CA | 2029917 | | 11/1990 | |
| GB | 2158350 | * | 11/1985 | 297/317 X |

* cited by examiner

*Primary Examiner*—Daniel P. Stodola
*Assistant Examiner*—Hugh B. Thompson
(74) *Attorney, Agent, or Firm*—MacMillan, Sobanski & Todd, LLC

(57) ABSTRACT

A wheelchair has a base and further comprises a seat frame mounted for tilting with respect to the base, and a seat frame tilting mechanism for rotating the seat frame with respect to the base. A back frame is mounted for reclining with respect to the base, and a back frame recline mechanism is positioned for rotating the back frame with respect to the base. A controller is provided for separately controlling the seat frame tilting mechanism and back frame recline mechanism so that the seat frame and the back frame can be rotated independently.

7 Claims, 6 Drawing Sheets

TILTING AND RECLINING WHEELCHAIR

TECHNICAL FIELD

The present invention relates to wheelchairs, and particularly to wheelchairs capable of moving the seat and back for tilting and reclining.

BACKGROUND OF THE INVENTION

Wheelchairs often have a fixed seat consisting of a seating surface and a back frame. The seating surface is usually either horizontal or slightly tilted back, with the front edge of the seating surface slightly higher than the rear edge of that surface. If the wheelchair user sits in the same position in a wheelchair for a long period of time, pressure is continuously applied to the tissue on the portion of the user's body (buttocks, legs, and/or back) that is bearing the user's weight in that position. Blood circulation to that tissue will be reduced, and ulcers or other problems can result.

To avoid these problems, it is necessary for people sitting in wheelchairs to shift their body weight from time to time. This is often accomplished by tilting the seat portion of the wheelchair backwards so that the user's weight is shifted away from the pressure points on the user's body. Also, the user's weight can be shifted by reclining the back frame.

A problem with wheelchairs that have both a tilt and recline capability is that the user's body is subject to shear problems during the maneuvering of the tilt and the recline apparatus. Due to the displacement between the anatomical pivot of the hip and the seat/back pivot, shear forces are introduced in the recline process. Previous efforts to mitigate this shear force have resulted in only crude approximations of the correct location of the back. Another problem seen in existing recline chairs is a tendency of the individual to slide out of the seat after repeated reclines. This can be due to the shear forces. Also the way the hip rotates during the recline process can be different from how it rotates when the individual comes back up or unreclines.

It would be advantageous if there could be developed a wheelchair having a tilt apparatus and a recline apparatus, where the tilt and recline functions are operated to minimize the shear forces transmitted to the wheelchair user. Also, it would be advantageous if there could be developed a method of unreclining, i.e., returning the reclined backrest of a wheelchair to an upright position, without causing the wheelchair user to have a tendency to slide forward along the wheelchair seat. Further, there is a need for improvements in wheelchairs to make them more conformable to the user's needs.

SUMMARY OF THE INVENTION

The above objects as well as other objects not specifically enumerated are achieved by a wheelchair having a base and further comprising a seat frame mounted for tilting with respect to the base, and a seat frame tilting mechanism for rotating the seat frame with respect to the base. A back frame is mounted for reclining with respect to the base, and a back frame recline mechanism is positioned for rotating the back frame with respect to the base. A controller is provided for separately controlling the seat frame tilting mechanism and back frame recline mechanism so that the seat frame and the back frame can be rotated independently.

According to this invention there is also provided a wheelchair having shear reducing characteristics. The wheelchair includes a wheelchair base, a back frame mounted for reclining relative to the base at various angles of recline with respect to an initial position, a shear plate mounted on the back frame for movement with respect to the back frame, and a counter weight mounted on the back frame and connected to the shear plate so that the shear plate is counterbalanced, thereby enabling the shear plate to be freely moved with respect to the back frame to reduce the shear experienced by users of the wheelchair.

Various objects and advantages of this invention will become apparent to those skilled in the art from the following detailed description of the preferred embodiment, when read in light of the accompanying drawings.

DETAILED DESCRIPTION OF THE INVENTION

Figure 1:
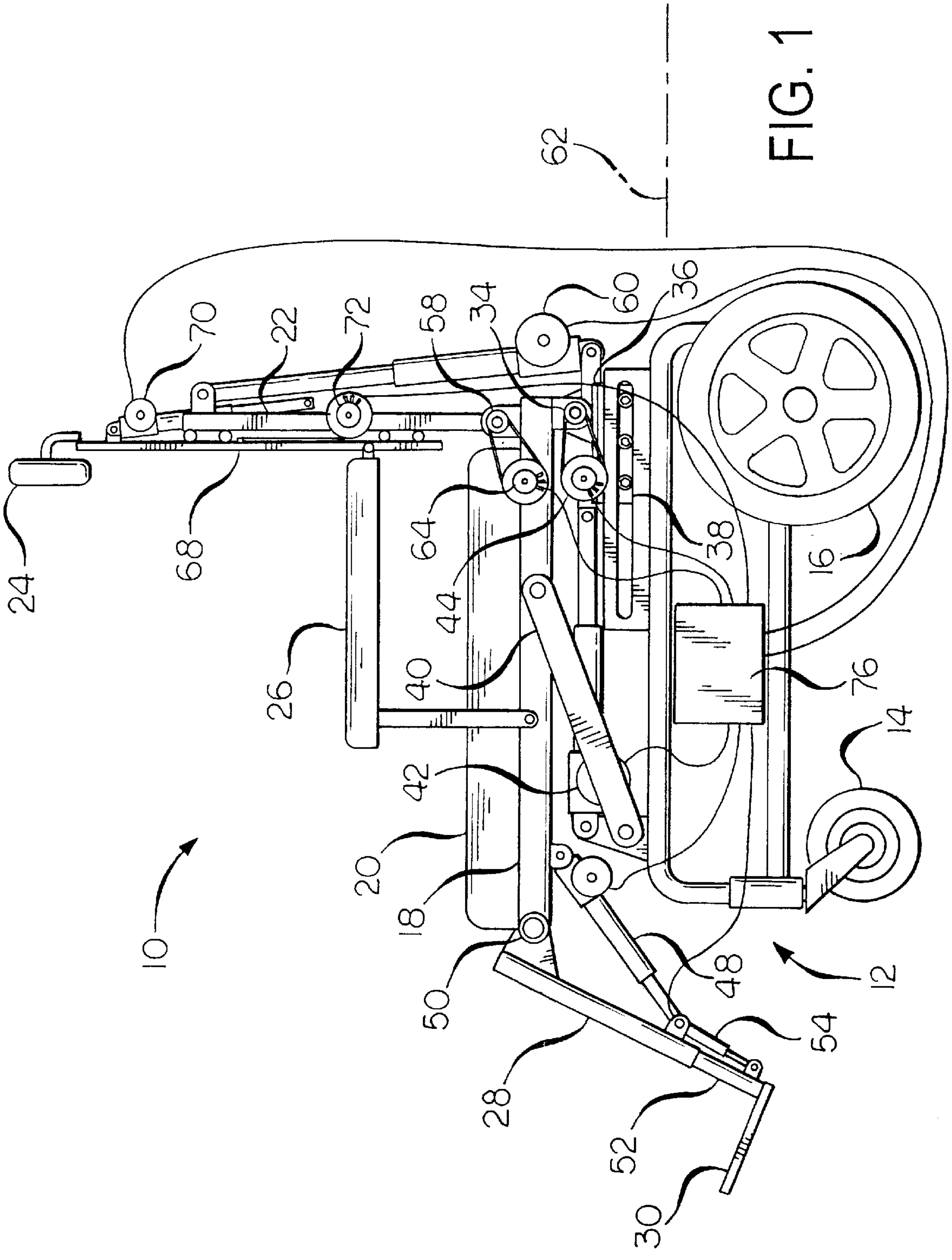
FIG. 1 is a schematic view in elevation of a wheelchair having the tilt and recline features of the invention.

As shown in FIG. 1, a wheelchair indicated generally at 10 is comprised of a wheelchair base 12, which is mounted for movement on front caster wheels 14 and rear drive wheels 16. The wheelchair is preferably provided with a drive motor, not shown, for each of the drive wheels, and a source of power for the drive motors, also not shown. A seat frame 18 supports a seat cushion 20 for the support of the user. A back frame 22 is provided to support the user's body, and a head rest 24 supports the user's head. The user's arms can be supported by armrests, partially shown at 26. Leg rests 28 and footrests 30 are also provided.

The seat frame is mounted for rotation or tilting in a clockwise direction (as shown in FIG. 1) so that the wheelchair user can be tipped back to shift the user's weight for comfort purposes and to relieve pressure from various body parts. The seat frame 18 is pivotally mounted at tilt pivot points 34, which are attached to a carriage 36. The carriage 36 is mounted for a sliding forward and rearward movement along a track or glide 38 fixed to the wheelchair base 12. Any other type of sliding movement can be used. A seat frame rear cross piece, not shown, can be an integral part of the carriage. As the carriage 36 is moved forward within the glide, the tilt pivot points 34, and hence the seat frame, are pulled forward with respect to the wheelchair base 12. A tilt linkage 40 hingedly connects the seat frame 18 to the wheelchair base 12. A tilt actuator 42, which can be an electrically powered linear actuator, is connected to the base to pull the carriage 36 forward with respect to the base, thereby tilting the seat frame 18. As the carriage slides forward, the tilt linkage 40 pushes up the front of the seat frame 18. The seat frame is provided with a tilt sensor 44 that provides an indication of the amount of tilt or rotation of the seat frame with respect to a frame of reference such as the wheelchair base 12. The tilt sensor 44 can be any suitable means for measuring the tilt. A tilt sensor that can be used for measuring tilt (or recline) is a potentiometer that provides an electrical signal indicative of the amount of tilt of the seat frame. Alternatively, pulses generated by a reed switch and magnets associated the actuator can be used to provide an electrical signal indicative of the amount of tilt or recline. Another means for measuring tilt or recline is a quadrature device. As shown, the tilt sensor 44 can be connected via a belt to the tilt pivot so that the potentiometer rotates upon tilting the seat frame. Although the tilting mechanism illustrated in FIG. 1 uses a horizontally oriented linear actuator, a vertically oriented linear actuator or any other tilting mechanism could be used as well.

The leg rests 28 are adapted with a leg rest actuators 48 that pivot the leg rests about pivot points 50 with respect to the seat frame 18. The leg rests are optionally provided with leg rest extensions 52, powered by extension actuators 54 to stretch out the length of the leg rests, thereby changing the distance between the footrests 30 and the seat frame. The leg rest extensions allow the leg rests to conform to the needs of the wheelchair user. Optionally, the footrests 30 can be pivotally mounted with respect to the leg rests 28, in a manner not illustrated, so that the angle between the foot-rests and the leg rests can be changed to accommodate the needs of the wheelchair user. It can be seen that the leg rest extensions and the pivoting of the footrests involve the use of movable frame members i.e., the leg rests 28 and the footrests 30, that can be moved to provide the wheelchair with user conforming characteristics. User conforming characteristics means that various frame members are moved to fit the particular physical characteristics of the user throughout various ranges of motion of the movable frame members. In conforming the frame member to the user, the frame member is moved or positioned in such a way as to minimize or eliminate the shear stress and other forces on the user's body. For example, the raising of the leg rests 28 by the action of the leg rest actuator 48 may require a corresponding extension of the leg rest extension 52 by the leg rest extension actuator 54 to accommodate the anatomical needs of the wheelchair user during this particular motion.

The wheelchair back frame 22 is mounted for reclining motion about recline pivot points 58. The recline pivot points can be positioned on the seat frame 18 as shown, or can be positioned on the wheelchair base 12 or on the carriage, as will be explained below. The reclining movement of the back frame can be driven by any suitable mechanism, such as a recline actuator 60 mounted on the carriage. Operation of the recline actuator rotates or reclines the back frame 22 from an initial position, shown in FIG. 1, to a reclined position. The recline actuator 60 is also used to raise up or unrecline the back frame. Although the initial position for the back frame can be any suitable orientation, it is preferably generally vertical, which is roughly 90 degrees with respect to the wheelchair base 12 or with respect to a horizontal line 62. When the back frame 22 is in a vertical position, the recline actuator 60 is vertically oriented. Recline sensors 64, which can be similar to the tilt sensors 44, can be used to measure the amount of recline of the back frame. The recline sensors could also be mounted in the actuator.

The back frame 22 of the wheelchair is provided with a shear plate 68 that is mounted for movement with respect to the back frame. The shear plate 68 can be any suitable back support member, and can be provided with a cushion, not shown. A shear plate actuator 70 is connected to the shear plate 68 and the back frame to move the shear plate with respect to the back frame. The movement of the shear plate is up and down with respect to the back frame, when the back frame is in a vertical orientation. More precisely the movement of the shear place is toward or away from the recline pivots 58. A shear plate sensor 72 measures the amount of movement of the shear plate with respect to the back frame.

The head rest 24 is mounted at the top end of the back frame. The head rest can be mounted for movement along length of the back frame (i.e., vertically in the view shown in FIG. 1) as well as movement forward or rearward with respect to the back frame. Alternatively, the head rest 24 can be mounted on the shear plate 68 for movement relative to the back frame 22. The headrest can be provided with a sensor, not shown, that indicates the position of the headrest with respect to a frame of reference, which can be the back frame 22, the shear plate 68, or the wheelchair base 12.

A controller 76 is provided to control the various wheelchair seating functions and movement of the various movable frame members, i.e., the seat frame 18, back frame 22, head rest 24, arm rests 26, leg rests 28, and foot rests 30. The controller can be any device suitable for controlling the various functions of the wheelchair. Preferably the controller 76 is a computer that is capable of receiving input from the various sensors, storing positioning sequences in a storage device, and sending signals to various actuators for moving the various frame members. For example, sensor 44 for sensing the amount of tilt of the seat frame and sensor recline sensor 64 for sensing the amount of recline of the back frame can be linked by a connection to the controller to enable the controller to be aware of the movement of the seat frame and back frame. The connection can be a hard wire as shown in the drawings, a radio signal device, or any other suitable device for communicating between the sensors and the controller.

The controller can be programmed to maintain limits associated with the tilt and recline features of the wheelchair. The controller can be programmed to allow the speed of the tilt and recline actuators to be adjusted. The controller can be provided with a timer or alarm that can be set to alert the user that it is time to perform a weight shift function.

Figure 4:
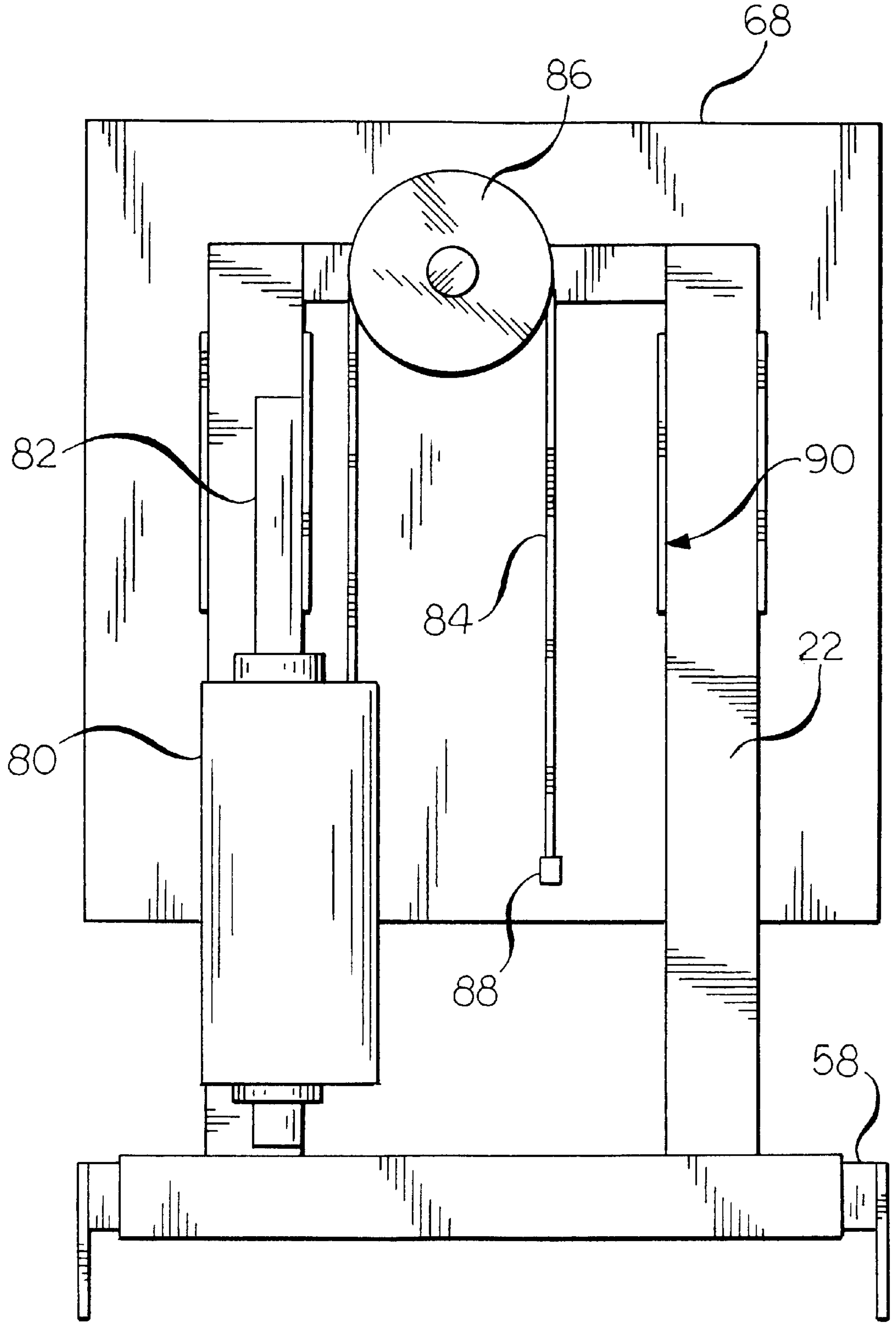
FIG. 4 is a schematic elevational view of the wheelchair back frame and counterbalanced shear plate.

As shown in FIG. 4 the shear plate 68 can be counterbalanced to make it easier to adjust the relative position of the shear plate and the back frame 22. This can be accomplished by providing a counter weight 80 that is preferably mounted for vertical (parallel) movement along a counterweight guide 82. The counterweight 80 can be mounted by a cable 84 that extends around a pulley 86 and is anchored at a cable anchor 88. Shear guides 90 can optionally be used to guide the shear plate with respect to the back frame 22.

A clutch, not shown, can be associated with the pulley 86, or the any other movable aspect of the back frame, to selectively allows movement of the shear plate with respect to the back frame. For example, the controller can be programmed so that the clutch allows movement of the shear plate with respect to the back frame only when the back frame is reclining. Other control schemes can be used, such as controlling the pulley to selectively allow movement of the shear plate with respect to the back frame. The controller can be programmed so that the movement of the shear plate with respect to the back frame is normally restricted, but is unrestricted when the back frame is reclining. The term "restricted" means that the relative movement between the shear plate and the back frame is prevented, and "unrestricted" means that the restriction is lifted.

The individual shear characteristics of each wheelchair user can be programmed into his or her particular wheelchair. This is accomplished by taking the user through a recline sequence and measuring the shear generated at the shear plate 68 at each point during the reclining process. This can be done in finite increments or as a continuum. In one embodiment of the invention, the shear is measured at several angles of recline, which means at least four different angles, preferably at least eight angles, and up to as much as an infinite amount of angles in a continuum. Set points or data points that include such information as position and shear measurements are taken during this programming process. Once programmed, the controller 94 will adjust the shear plate during the recline sequence to avoid generating shear between the user and the shear plate 68.

Operation of the programmed controller 94 includes driving the shear plate 68 as the back frame 22 reclines to eliminate any displacement between user and the shear plate. To do this the controller senses the recline angle through the recline sensor 64 and moves the shear plate to a programmed location. The controller 94 can determine the position of the shear plate through the shear sensor. The shear function, that is the position of the shear plate as a function of the recline angle, is unique for each individual user. Furthermore the shape of this function is unique as well. For this reason attempting to set this program with a mechanical linkage and in a linear relationship, as most current systems do, results in a less than satisfactory control pattern. The programming of the controller according to the method of the invention can be accomplished in a variety of ways.

One of the methods used to reduce shear is to counter balance the shear plate 68, as disclosed above in FIG. 4. The shear plate is mounted on the glides 90 to allow it to easily move up and down on the back frame 22. The back frame is pivotally connected for a reclining motion. The counterweight 80 is mounted to a second glide 82 positioned between it and the back frame 22. This counterweight glide 82 is mounted such that the weight 80 may also travel up and down parallel to the shear plate. The mass of the counter weight 80 is the same as the shear plate 68. With this configuration any shear force present as a result of reclining an individual seated in the chair will cause the shear plate to move and mitigate this force. As the back frame reclines both the shear plate 68 and the counter weight 80 transfer more and more of their weight to the glides 82 and 90, thereby maintaining the initial equilibrium. Preferably, the back is counter-balanced using a weight equivalent to the weight of the shear plate 68 and everything attached to it, such as a back cushion, not shown, the head rest 24, and other equipment associated with the back frame.

A first method of establishing tilt and recline control parameters for a particular user involves sensing the shear forces experienced by the user during a recline operation. As the user reclines, any shear forces that exist will cause the back to travel up or down, thereby mitigating the shear force. The controller will record the readings of the shear plate at intervals during the recline and, using these points, generate a shear function.

A second method of establishing tilt and recline control parameters for a particular user is to recline the back frame 22 and at intervals stop and adjust the shear plate 68. The adjustments are recorded. The controller 94 is used to stop the recline process at predetermined intervals. The user, a therapist or an attendant can make the adjustments.

A third method of establishing the tilt and recline control parameters for a particular user is to use some point on the user's body to follow during the recline programming. This reference point is preferably a reference with respect to the user's head since the head is attached through the spine to the hip, and therefore makes a fairly reliable frame of reference.

In the most preferred embodiment of the invention, the movements of the seat frame 18 and the back frame 22 are independently actuated, but are coordinated for the is best kinematic motion for the wheelchair user. To perform a tilt of the seat frame 18 while controlling the angle between the seat frame and the back frame 22, both the tilt actuator 42 for the seat frame 18 and the recline actuator 60 for the back frame are used. For tilt to occur, the seat frame must rotate, and at the same time the recline actuator 60 must rotate the back frame to maintain the seat-to-back angle at a constant level. In this configuration, the recline actuator 60 does not move the back frame 22 in relation to the seat frame 18, but rather in relation to the wheelchair base 12 or the carriage 36.

The controller 94 of the invention is also capable of activating the tilt and recline in concert. One of the advantages of the invention is that the unrecline process, i.e., the process of returning to an upright position from a reclined position, can be accomplished in a manner to overcome the tendency of the user to slide out of the seat during the unrecline process. It has been discovered that during the unrecline process, if the user tilts the seat frame 18 upward before the back fame is unreclined or brought up, the user's hips are stabilized and the unrecline process is more stable for the user, and more repeatable. The controller 94 can coordinate both the tilt and the recline operations into a single function. Several sequences exist.

Figure 2A:
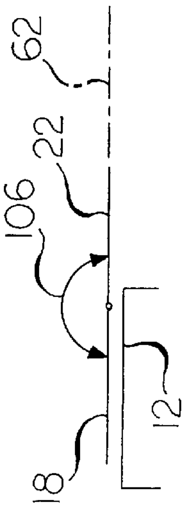
FIGS. 2*a*–2*d* schematically illustrate the unreclining sequence of the invention.
Figure 2B:
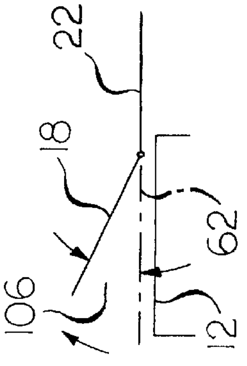
Figure 2C:
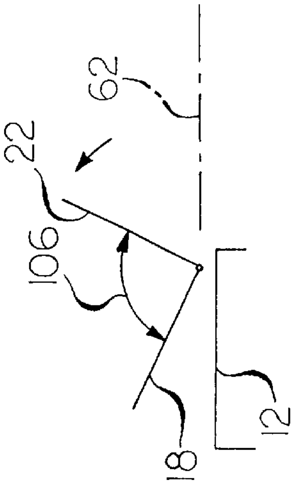
Figure 2D:
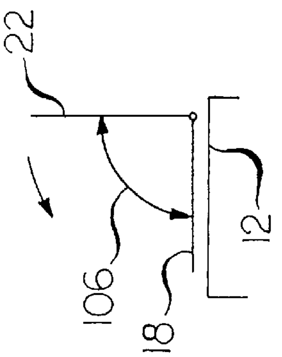

A first unrecline sequence according to this invention is shown in FIGS. 2*a*–2*d*. As shown in FIG. 2*a*, the wheelchair is initially configured with the seat frame 18 untilted with respect to the wheelchair base 12, and with the back frame 22 reclined to an angle generally parallel to the horizontal line 62. The angle formed between the seat frame and the back frame, indicated at 106, is approximately 180 degrees. The unrecline process begins by tilting the seat frame 18 a moderate amount, such as an angle 108 of about 30–45 degrees with respect to the horizontal line 62, for example. This is shown in FIG. 2*b*. The third step is an unreclining of the back frame 22 so that the angle 106 between the seat frame and the back frame is within the range of from about 80 to about 120 degrees, such as about 90 degrees, for example. The final step is bringing both the seat frame and the back frame to an upright position together as the seat-to-back angle 106 is maintained relatively constant, as shown in FIG. 2*d*. By tilting the seat frame 18 prior to the unreclining of the back frame, the wheelchair user is not subject to the forces that would cause a tendency for the wheelchair user to slide out of the wheelchair during the unrecline process.

Figure 3A:
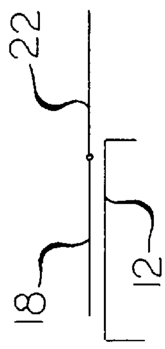
FIGS. 3*a*–3*d* schematically illustrate a different unreclining sequence of the invention.
Figure 3B:
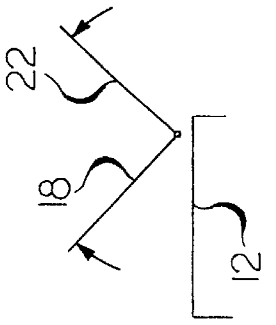
Figure 3C:
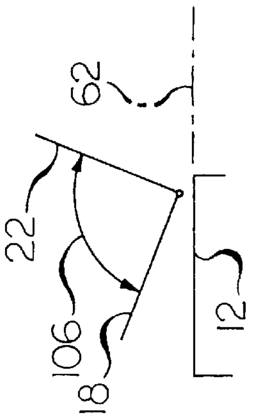
Figure 3D:
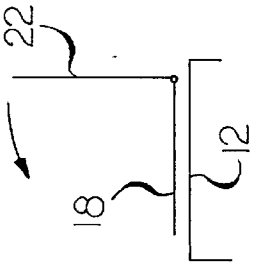

An alternate unrecline sequence is shown in FIGS. 3*a*–3*d*. This sequence is similar to that shown in FIGS. 2*a*–2*d*, except that instead of tilting the seat frame 18 (shown in FIG. 2*b*) prior to beginning the unrecline of the back frame 22 (shown in FIG. 2*c*), the unrecline of the back frame 22 occurs simultaneously with the tilt of the seat frame 18, as shown in FIG. 3*b*. Once the angle 106 between the seat frame and the back frame is brought to within the range of from about 80 to about 120 degrees, as shown in FIG. 3*c*, the seat frame and back frame are both rotated to the upright position, as shown in FIG. 3*d*, while maintaining the angle 106 within the range of from about 80 to about 120 degrees.

Figure 5:
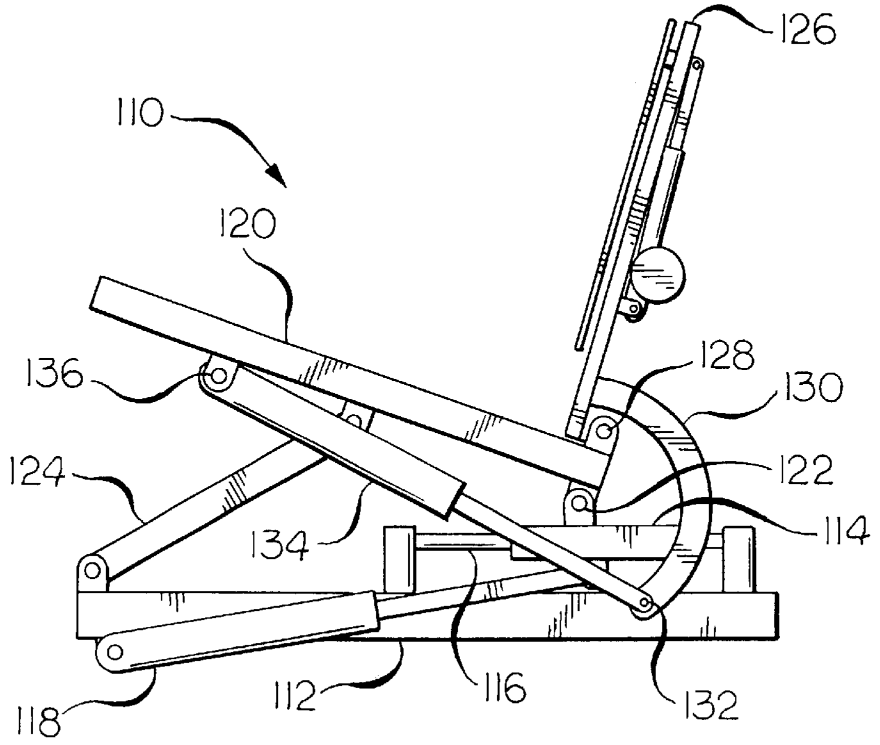
FIG. 5 is a schematic view in elevation of a tilting and reclining wheelchair according to the invention.

Several different arrangements can be used to accomplish the tilting and reclining of the seat frame and the back frame. As shown in FIG. 5, the wheelchair, indicated generally at 110 includes a base 112, and a carriage 114 slidably mounted on a guide member 116 for forward and rearward movement by the action of a linear actuator 118. The seat frame 120 is pivotally mounted on the carriage 114 at pivot point 122, and linked to the base 112 with a pivotally mounted strut 124 so that when the carriage is moved forward the seat frame 120 will tilt or rotate. The carriage 114, strut 124 and actuator 118 comprise a seat frame tilting mechanism for tilting or rotating the seat frame 120.

The back frame 126 is pivotally mounted on the seat frame at pivot point 128, which can be the same as the seat frame pivot point 122, although not shown that way in FIG. 5. A rigid structural member, such as bell crank 130, is connected via pivot point 132 and actuator 134 to the seat frame 120. The bell crank and actuator 134 act together to form a back frame recline mechanism for rotating the back frame 126 with respect to the seat frame. The actuator 134 is pivotally connected to the seat frame 120 at pivot point 136. It can be seen that with no activation of the actuator 134, tilting of the seat frame 120 causes a corresponding movement of the back frame, and the angle between the seat frame and the back frame is maintained constant. Movement or activation of the actuator 134 causes the back frame to move relative to the seat frame, thereby changing the angle between the seat frame and the back frame. It is to be understood that numerous other arrangements can be used to move the back frame relative to the seat frame.

Figure 6:
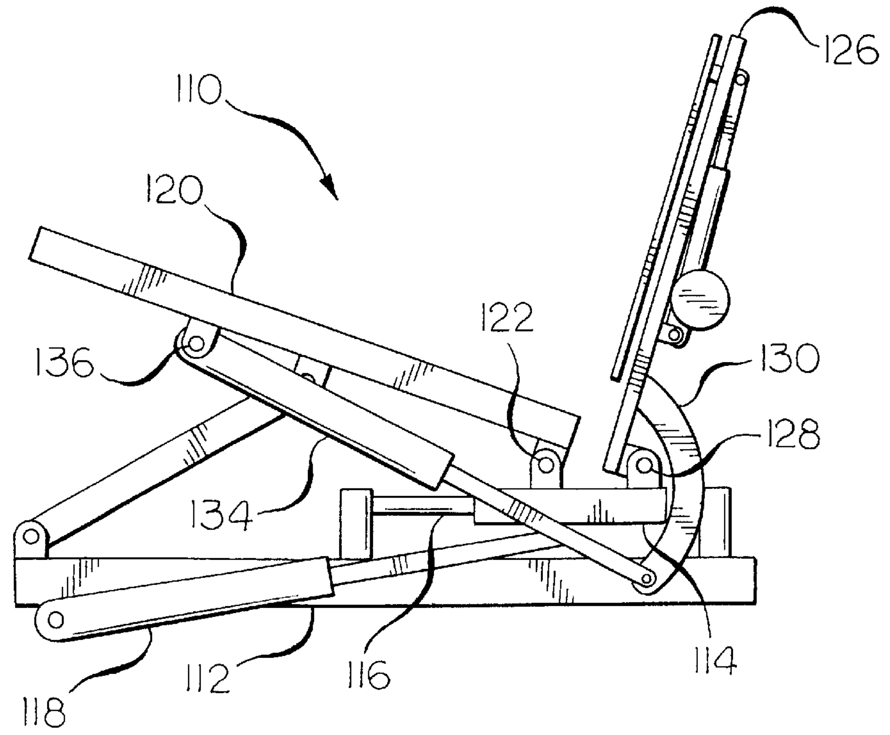
FIG. 6 is a schematic view in elevation of a different tilting and reclining wheelchair according to the invention.

In the wheelchair 110 shown in FIG. 6, the back frame 126 is pivotally mounted at pivot point 128 relative to the carriage 114, and hence relative to the base 112, rather than relative to the seat frame 120. However, the back frame 126 is still actuated with respect to the seat frame 120 by means of the actuator 134 and the bell crank 130, so that movement of the seat frame 120 will cause a similar movement of the back frame 126. This will keep the angle between the seat frame and the seat back relatively constant when the seat frame 120 is tilted, unless the actuator 134 changes that angle.

Figure 7:
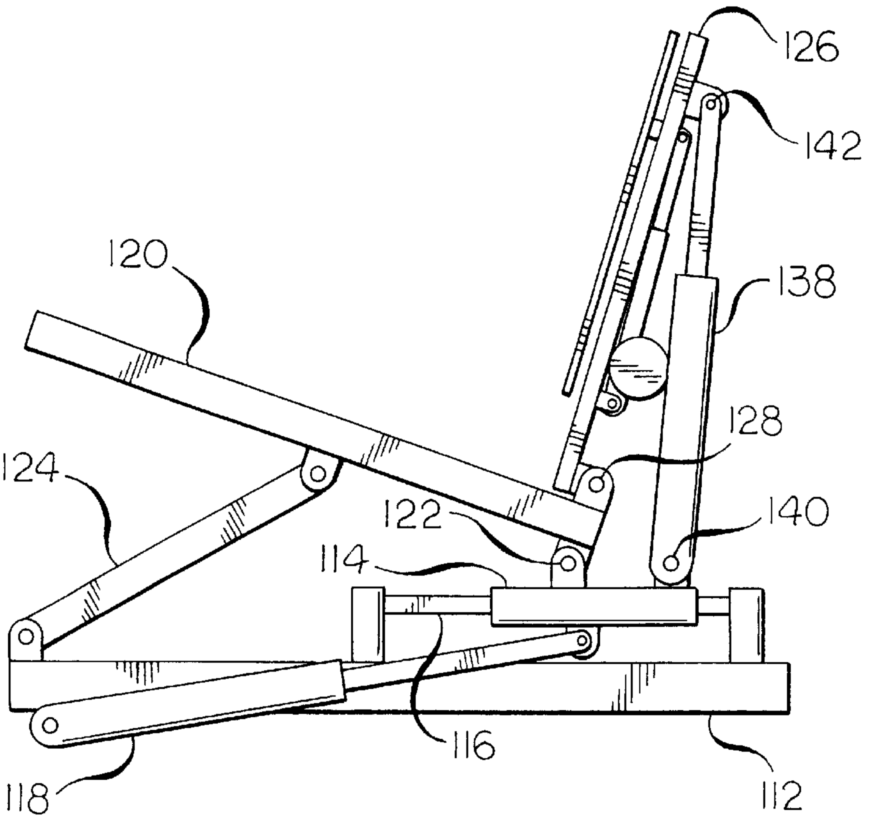
FIG. 7 is a schematic view in elevation of another tilting and reclining wheelchair according to the invention.

The wheelchair 110 illustrated in FIG. 7 includes the seat frame 120 pivotally mounted from the carriage 114 at pivot point 122, and the back frame 126 pivotally mounted from the seat frame at pivot point 128. The back frame 126 is movable with respect to the carriage 114 by means of a back frame actuator 138, pivotally mounted from the carriage at pivot point 140. The back frame actuator 138 is pivotally connected to the back frame 126 at pivotal connection 142. It can be seen that tilting the seat frame 120 will not cause a significant movement in the back frame 126. The back frame is independently operable relative to the tilting of the seat frame. In order to tilt the seat frame and still maintain a constant angle between the seat frame and the back frame, both the seat frame actuator 134 and the back frame actuator 138 must be coordinated.

Figure 8:
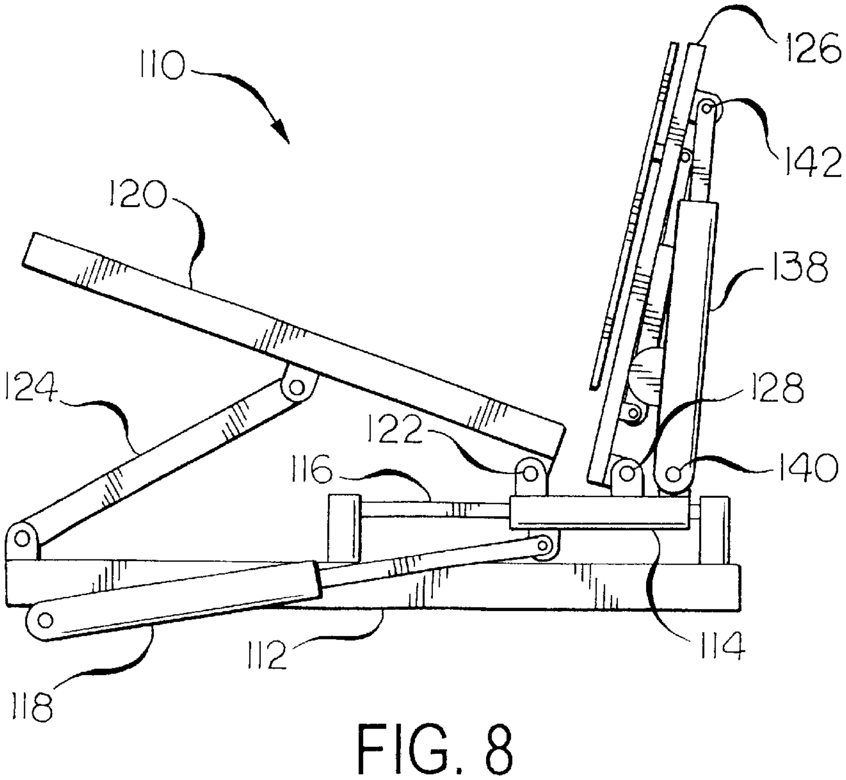
FIG. 8 is a schematic view in elevation of yet another tilting and reclining wheelchair according to the invention.

FIG. 8 illustrates another embodiment of the wheelchair 110 similar to those shown in FIGS. 5–7, but having both the back frame pivot point 128 and the back frame actuator 138 mounted on the carriage 114. It can be seen that tilting of the seat frame 120 will not result in any movement of the back frame 126. The back frame is independently operable relative to the tilting of the seat frame. In order to tilt the seat frame and still maintain a constant angle between the seat frame and the back frame, both the seat frame actuator 134 and the back frame actuator 138 must be coordinated.

Figure 9:
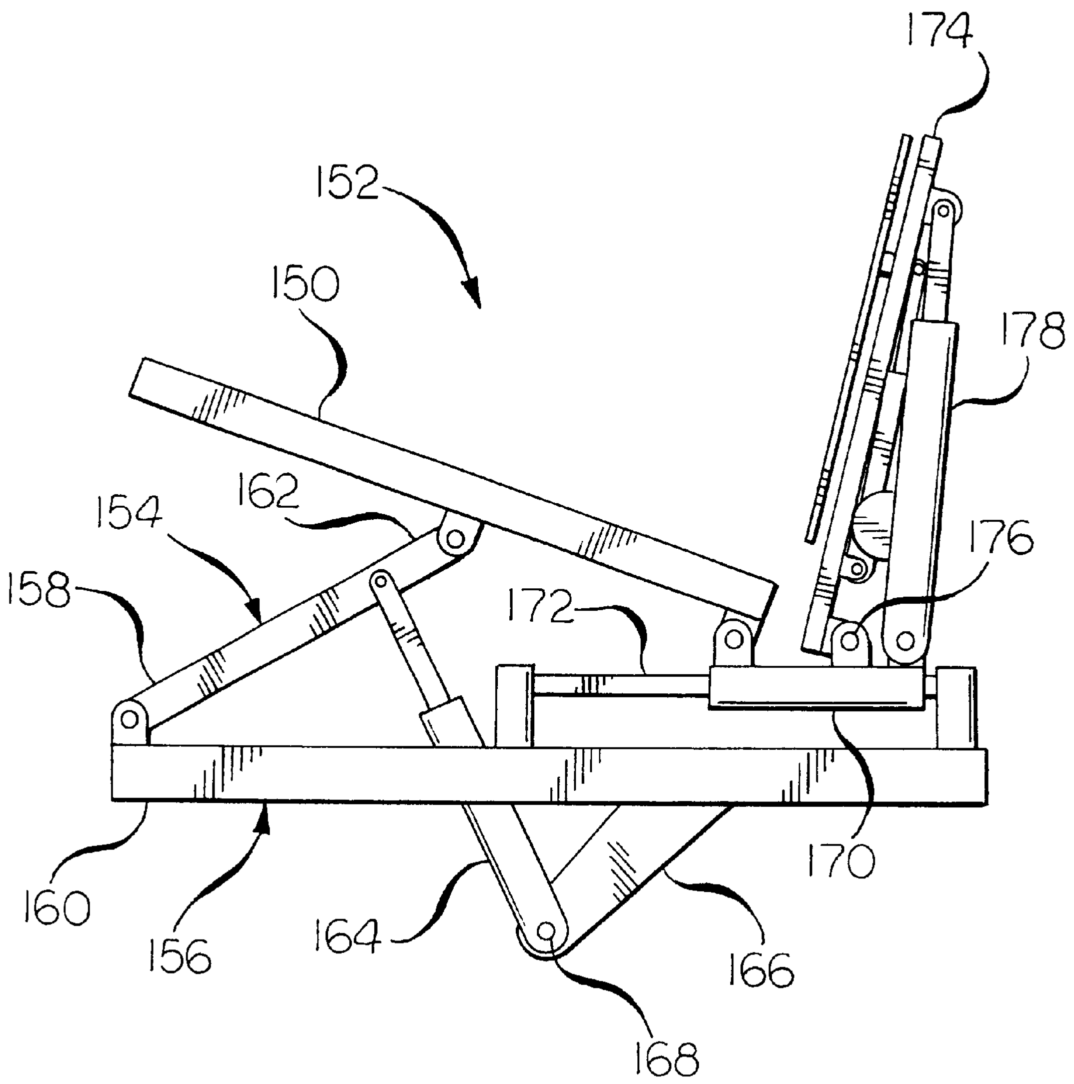
FIG. 9 is a schematic view of a different wheelchair capable of tilting and reclining according to the invention.

As shown in FIG. 9, the seat frame 150 of another wheelchair 152 according to the invention is mounted on a strut 154 for elevation with respect to the base 156. The strut 154 is pivotally mounted at a first end 158 on a forward end 160 of the base and pivotally connected at a second end 162 to the seat frame 150. An actuator 164 is pivotally connected (indirectly) to the base 156 via a support arm 166, at pivot point 168. The actuator is also pivotally connected to the strut. As can be seen in FIG. 9, the actuator 164 is pivotally mounted to the strut 154 at a point intermediate the first end 158 and the second end 160. The actuator 158 tilts or rotates the seat frame 150. As the seat frame 150 is raised, the carriage 170 is pulled forward on the guide member 172. The back frame 174 is mounted via pivot pin 176 to the carriage 170 and is articulated or reclined by the action of the back frame actuator 178.

The principle and mode of operation of this invention have been described in its preferred embodiments. However, it should be noted that this invention may be practiced otherwise than as specifically illustrated and described without departing from its scope.

What is claimed is:

1. A wheelchair having a base and further comprising:

a seat frame mounted for tilting with respect to the base;

a strut pivotally mounted at a first end on a forward end of the base and pivotally connected at a second end to the seat frame;

an actuator pivotally mounted to the base and pivotally mounted directly to the strut;

wherein, extension of the actuator rotates the strut with respect to the base, thereby tilting the seat frame with respect to the base.

2. The wheelchair of claim 1 in which the seat frame is pivotally mounted on a carriage that is mounted for a sliding forward and rearward movement with respect to the base.

3. The wheelchair of claim 1 in which the pivotal mounting of the actuator to the base comprises pivotally mounting the actuator on a support arm that is attached to the base.

4. The wheelchair of claim 1 in which the actuator is pivotally mounted to the strut at a point intermediate the first end and the second end.

5. A wheelchair having a base and further comprising:

a seat frame mounted for tilting with respect to the base;

a strut pivotally mounted at a first end on a forward end of the base and pivotally connected at a second end to the seat frame;

an actuator pivotally mounted to the base and pivotally mounted to the strut, the actuator being pivotally mounted to the strut at a point intermediate the first end and the second end;

wherein, extension of the actuator rotates the strut with respect to the base, thereby tilting the seat frame with respect to the base.

6. The wheelchair of claim 5 in which the seat frame is pivotally mounted on a carriage that is mounted for a sliding forward and rearward movement with respect to the base.

7. The wheelchair of claim 5 in which the pivotal mounting of the actuator to the base comprises pivotally mounting the actuator on a support arm that is attached to the base.

* * * * *